(12) United States Patent
Donovan

(10) Patent No.: US 6,970,930 B1
(45) Date of Patent: Nov. 29, 2005

(54) METHOD AND SYSTEM OF PROVIDING DIFFERENTIATED SERVICES

(75) Inventor: Steven R. Donovan, Plano, TX (US)

(73) Assignee: MCI, Inc., Ashburn, VA (US)

( * ) Notice: Subject to any disclaimer, the term of this patent is extended or adjusted under 35 U.S.C. 154(b) by 0 days.

(21) Appl. No.: 09/435,540

(22) Filed: Nov. 8, 1999

Related U.S. Application Data

(60) Provisional application No. 60/163,913, filed on Nov. 5, 1999.

(51) Int. Cl.[7] .............................................. G06F 15/16
(52) U.S. Cl. .................... 709/227; 709/220; 709/223; 709/242; 709/228
(58) Field of Search .................................. 709/227, 228, 709/230, 232, 223, 231, 220

(56) References Cited

U.S. PATENT DOCUMENTS

| | | | |
|---|---|---|---|
| 5,634,012 A | | 5/1997 | Stefik et al. |
| 5,680,116 A | | 10/1997 | Hashimoto et al. ......... 340/827 |
| 5,745,694 A | | 4/1998 | Egawa et al. |
| 5,825,772 A | | 10/1998 | Dobbins et al. |
| 5,867,571 A | * | 2/1999 | Borchering ................. 379/230 |
| 5,883,894 A | | 3/1999 | Patel et al. .................. 370/348 |
| 5,889,777 A | * | 3/1999 | Miyao et al. ................ 370/345 |
| 5,903,559 A | * | 5/1999 | Acharya et al. ............ 370/355 |
| 5,903,735 A | | 5/1999 | Kidder et al. |
| 5,909,430 A | * | 6/1999 | Reaves ....................... 370/254 |
| 5,930,348 A | | 7/1999 | Regnier et al. ............. 379/221 |
| 5,933,412 A | * | 8/1999 | Choudhury et al. ........ 370/218 |
| 5,953,338 A | * | 9/1999 | Ma et al. .................... 370/395 |
| 5,960,416 A | | 9/1999 | Block |
| 5,991,292 A | * | 11/1999 | Focsaneanu et al. ........ 370/352 |
| 6,058,113 A | * | 5/2000 | Chang ........................ 370/390 |
| 6,073,160 A | | 6/2000 | Grantham et al. |
| 6,088,358 A | * | 7/2000 | Tomita et al. .............. 370/395 |
| 6,097,722 A | * | 8/2000 | Graham et al. ............. 370/395 |
| 6,108,314 A | | 8/2000 | Jones et al. |
| 6,137,777 A | * | 10/2000 | Vaid et al. .................. 370/230 |
| 6,141,686 A | * | 10/2000 | Jackowski et al. .......... 709/224 |
| 6,151,319 A | * | 11/2000 | Dommety et al. .......... 370/395 |
| 6,157,648 A | | 12/2000 | Voit et al. ................... 370/401 |
| 6,195,355 B1 | | 2/2001 | Demizu |
| 6,205,148 B1 | * | 3/2001 | Takahashi et al. .......... 370/401 |
| 6,298,383 B1 | * | 10/2001 | Gutman et al. ............. 709/229 |
| 6,584,093 B1 | | 6/2003 | Salama et al. |
| 6,678,264 B1 | | 1/2004 | Gibson |
| 2001/0025310 A1 | | 9/2001 | Krishnamurthy et al. |
| 2001/0027490 A1 | | 10/2001 | Fodor et al. |
| 2001/0048682 A1 | | 12/2001 | Fichou et al. |

OTHER PUBLICATIONS

Arao et al., "Component–Based Policy Deployment for Service Level Differentiation in Converging Communication Networks", Jun. 10, 1999, IEEE Tnternational Conference Communications, 1999, vol. 2, pp. 1388–1392.*

Schulzrinne, Henning; Rosenberg, Jonathan; Lennox, Jonathan, "Interaction of Call Setup and Resource Reservation Protocols in Internet Telephony", Jun. 15, 1999, Technical Report.*

Erikkson et al., "SIP Telephony Gateway on DTM", Jul. 2, 1999, Bachelor's Thesis, Royal Institute of Technology, Sweden.*

(Continued)

*Primary Examiner*—Dung C. Dinh
*Assistant Examiner*—Victor Lesniewski

(57) ABSTRACT

A method for combining Internet protocols in a Differentiated Services model environment is described. The Session Initiation Protocol (SIP) and Common Open Policy Service (COPS) are combined together to provide methods of setting up a session and tearing down a session, while maintaining Authentication, Authorization, and Accounting (AAA) policies. The Open Settlement Policy (OSP) is also combined with SIP and COPS. This combination provides for an interchange of parameters between session setup, teardown, authorization, policy, Quality of Service (QoS), and usage reporting

33 Claims, 5 Drawing Sheets

OTHER PUBLICATIONS

Boyle et al., "The COPS (Common Open Policy Service) Protocol", Aug. 1999, http://www.ietf.org/internet-drafts/drafts-ietf-rap-cops-07.txt.*

Ping et al., "Diameter: Policy and Accounting Extension for SIP", Internet Draft, Nov. 15, 1998, <http://www.cs.columbia.edu/sip/drafts/draft-pan-diameter-sip-01.txt>.

Ekstein et al., "AAA Protocols: Comparison Between Radius and Diameter and COPS", Internet Draft, Aug. 1999, <http://search.ietf.org/internet-drafts/draft-ekstein-roamops-protocol-00.txt>.

Hubaux et al., "The Impact of the Internet on Telecommunication Architectures", Computer Networks, Elsevier Science Publishers B.V., Amsterdam, NL, Feb. 11, 1999, vol. 31, No. 3, pp. 257–273.

Kauser et al., "A Charging Model for Sessions on the Internet", Computers and Communications, 1999 Proceedings IEEE International Symposium on Red Sea, Egypt, Jul. 6–8, 1999, Los Alamitos, CA, USA, IEEE Computer Society, US, Jul. 6, 1999, pp. 32–38.

Wright et al., "IP Telephony vs. ATM: What is There to Discuss?" $1^{st}$ IEEE International Conference on ATM, ICATM'98 Conference Proceedings, Colmar, France, Jun. 22–24, 1998, IEEE International Conference on ATM, New York, NY, IEEE, US, Jun. 22, 1998, pp. 400–409.

Braden, R., Clark D. and S. Shenkar, "Integrated Services in the Internet Architecture: an Overview," RFC 1633, Jul. 1994.

Blake, S., Black, D. Carlson, M., Davies, E., Wang, Z. and W. Weiss, "An Architecture for Differentiated Services," RFC 2475, Dec. 1998.

Rosen, E. and Y. Rekhter, "BGP/MPLS VPNs," RFC 2547, Mar. 1999.

Gleeson, B., Lin., A., Heinanen, J., Finland, T., Armitage, G. and A. Malis, "A Framework for IP Based Virtual Private Networks," RFC 2764, Feb. 2000.

Daniele, M., Haberman, B., Routhier, S. and J. Schoenwaelder, "Textual Conventions for Internet Network Addresses," RFC 2851, Jun. 2000.

Bernet, Y., Ford, P., Yavatkar, R., Baker, F., Zhang, L., Speer, M., Braden, R., Davie, B., Wroclawski, J. and E. Felstaine, "A Framework for Integrated Services Operation over Diffserv Networks," RFC 2998, Nov. 2000.

Rosenberg, J. et al., Internet Telephony Gateway Location, 1998 IEEE, pp. 488–496.

Schulzrinne, H.A., A Comprehensive Multimedia Control Architecture for the Internet, 1997 IEEE, pp. 65–76.

Wedlund, E. et al., Mobility Support Using SIP, 1999 Association for Computing Machinery, pp. 76–82.

Rosenberg, J., et al, Internet Telephony Gateway Location, 1998 IEEE, pp. 488–496.

Schulzrinne, H.A., A Comprehensive Multimedia Control Architecture for Computing Machinery, pp. 76–82.

Wedlund, E., et al., Mobility Support Using SIP, 1999 Association for Computing Machinery, pp. 76–82.

Barzilai et al., "Design and Implementation of an RSVP-Based Quality of Service Architecture for Integrated Services Internet", 1997, IEEE.*

Bernet et al, "A Framework for Differentiated Services", Feb. 1999, http://www.ietf.org/internet-draft-ieft-diffserv-framework-02.txt.*

Boyle et al., "The COPS (Common Open Policy Service) Protocol", Aug. 1999, http://www.ieft.org/internet-drafts/draft-ieft-rap-cops-07.txt.*

Boyle et al., "COPS Usage for RSVP", Jun. 1999, http://www.ieft.org/internet-draft-ieft-diffserv-framework-02.txt.*

Barden et al., "Resource ReSerVation Protocol (RSVP): Version I Functional Specification", Sep. 1997, Network Working Group RFC 2205, ftp://ftp.isi.edu/in-notos/rfc2205.txt.*

Braun, T, "Internet Protocols for Multimedia Communications", Oct. 1997, IEEE Multimedia.*

Eriksson et al., "SIP Telephony Gateway on DTM", Jul. 2, 1999, Bachelor's Thesis, Royal Institute of Technology, Sweden.*

IPHighway Product Overview, http://iphighway.com/prod/.

Roberts, E., "The New Class System: Comprehensive Approaches Give Net Managers the Power to Prioritize . . . " http://www.data.com/roundups/class_system.html.

Schulzrinne et al., "Interaction of Call Setup and Resource Reservation Protocols in Internet Telephony", Jun. 15, 1999, Technical Report.

Schulzrinne et al., "Signaling for Internet Telephony", Feb. 2, 1998, Columbia University, Dept. of Computer Science Technical Report CUCS–005–98.

Sinnreich et al., "Interdomain IP Communications with QoS, Authentication and Usage Reporting", Feb. 2000, Internet Draft.

Sinnreich et al., "AAA Usage for IP Telephony with QoS", Mar. 3, 2000, http://www.fys.ruu.nl/~wwwfi/aaaarch/pittsburg/sinnreich/sld001.htm.

Sinnreich et al., "AAA Usage for IP Telephony with QoS", IETF Internet Draft, Jul. 2000.

White, P., "RXVP and Integrated Services in the Internet: A Tutorial", May 1997, IEEE Communications Magazine.

Wroclawski, J., "The Use of RSVP with IETF Intergrated Services" Sep. 1997, ftp://ftp.isi.edu/in-notes/rfc2210.txt.

Yavatkar et al., "A Framework for Policy-Based Admission Control", Mar. 1999, http://www.ietf.org/internet-drafts/draft-ietf-rap-framework-03.txt.

Brazilai et al., "Design and Implementation of an RSVP-Based Quality of Service Architecture for Integrated Services Internet", Distributed Computing Systems, 1997, Proceedings of the 17th International Conference on Baltimore, MD, US, May 27–30, 1997, Los Alamitos, CA, US IEE Computer Soc., US, May 27, 1997, pp. 543–551.

Handley et al., "SIP: Session Initiation Protocol", IETF RFC 2543, Mar. 31, 1999, pp. 7–17, http://www.lett.org/rtc/rtc2543.txt.

Sinnreich et al., "AAA Usage for IP Telephony with QoS", Internet Draft, Jan. 2001, pp. 1–20.

Stojsic et al., "Formal Definition of SIP Proxy Behavior", 2001 IEEE, pp. 289–292.

Salsano et al., "QoS Control by Means of COPS to Support SIP–Based Applications", Mar./Apr. 2002, pp. 27–33.

Flykt et al., "SIP Services and Interworking with Ipv6", Mar. 2001, pp. 186–190.

Neilson et al., "Discussion of Bandwith Broker Requirements for Internet2 Qbone Deployment Version 0/7", IEEE Internet Draft, Aug. 1999, pp. 1–30.

Kumar et al., "Beyone Best Effort" Router Architerctures for the Differentiated Services of Tomorrow's Internet, IEEE Communications Magazine, IEEE Service Center, Piscataway, NJ, US, vol. 36, No. 5, May 1, 1998, pp. 152–164.

Balmer et al., "A Concept for RSVP Over DiffServ", Computer Communications and Networks, 2000 Proceedings, Ninth International Conference on Las Vegas, NV, US, Oct. 2000, pp. 412–417.

Bernet, "The Complementary Roles of RSVP and Differentiated Services in the Full–Service QOS Network", IEEE Communications Magazine, IEEE Service Center, Piscataway, NJ, US, vol. 39, No. 2, Feb. 2000, pp. 154–162.

Mamais et al., "Efficient Buffer Management and Scheduling in a Combined IntServ and DiffServ Architecture: A Performance Study", ATM, 1999 ICATM '99, 199 $2^{nd}$ International Conference on Colmar, France, Jun. 21–23, 1999, Piscataway, NJ, US, IEEE, US, Jun. 21, 1999, pp. 236–242.

Detti et al., "Supporting RSVP in a Differentiated Service Domain: An Architectural Framework and a Scalability Analysis", ICC '99, 1999 IEEE International Conference on Communications, Conference Record, Vancouver, CA, Jun. 6–10, 1999, IEEE International Conference on Communications, New York, NY: IEEE, US, vol. 1, Jun. 6, 1999, pp. 204–210.

Hussmann et al., "An Edge Device for Supporting Internet Integrated Services Over Switched ATM Networks", Interoperable Communicatios Networks, Baltzer Science Publishers, Busman, NL, Sep. 1998, pp. 321–330.

* cited by examiner

Internet Protocol v.4 Header

METHOD AND SYSTEM OF PROVIDING DIFFERENTIATED SERVICES

This application claims the benefit under 35 U.S.C. § 119(e) of U.S. Provisional application Ser. No. 60/163,913, filed Nov. 5, 1999.

BACKGROUND OF THE INVENTION

1. Field of the Invention

The present invention relates generally to the field of Internet multimedia communication, and, more particularly, to a method for combining Internet protocols for session setup, teardown, authorization, and accounting in a Internet Protocol (IP) network, which uses the DiffSERV (Differentiated Services) model in order to guarantee Quality of Service (QoS).

2. Description of the Related Art

The invention of the telephone opened an unprecedented era in personal communication. At the present time, the Internet is opening up another era in personal communication, allowing a level of interactivity previously unknown between computers and groups of computers. In the future, these two services will be combined into one seamless communication medium.

However, the concepts underlying the telephone system and the Internet are fundamentally different. The telephone system is circuit-based; meaning that, for example, when a call is set up between caller and callee, a dedicated line, or circuit, is maintained between the two, and, when the call is over, the dedicated line is taken down. The Internet is packet-based; meaning that, for example, when a user downloads a web page, or receives an e-mail, the data that comprises the web page or e-mail is broken down into packets before being transmitted. The individual packets, although they form one web page or one e-mail message, may take entirely different routes between the sender and the destination. The destination computer puts all the packets together to form the web page.

A fundamental problem lies in providing a circuit-based service, such as a telephone call or videoconferencing, over a packet-based network. While the answer may appear simple-digitize and packetize the audio or visual information - the situation is more complicated than it appears. For one thing, an application such as a telephone call requires a constant transmission rate; something the current Internet cannot guarantee. An application such as videoconferencing using MPEG has stringent real-time requirements in order to avoid the displayed motion appearing jerky. These requirements include a variable transmission rate and very little jitter in the packet arrival times. Once again, at present the Internet cannot guarantee these requirements will be met.

One system for addressing these Quality of Service (QoS) issues on the Internet is the DiffServ model, or Differentiated Services architecture (RFC 2475). In DiffServ, packet traffic shaping is implemented by network routers. In order to specify the transmission requirements, DiffServ uses the Type of Service (ToS) bits in the Internet Protocol (IP) packet header (see FIG. 1). Although the ToS field exists in the current protocol IPv4 (Internet Protocol, version 4), most routers do not use or read the bits in the ToS field. DiffServ uses these bits to tell the router the priority of the packet. Because of this, the ToS field in the IP header is referred to as the DS field.

DiffServ is implemented in the following manner: when packet traffic enters a DiffServ network, the packets are classified and possibly conditioned at the network boundary, most likely in an edge router. The DS field will be filled in with the appropriate bits for that type of traffic, which may depend on customer usage, media specification, general policy, etc. The network nodes inside the DiffServ network will read the DS field to determine how to manage incoming packets. For instance, if an edge router recognizes incoming packets as being high priority, the router will classify those packets as high priority in the DS field, and then send those packets inside the network. When those high priority packets reach a network node, the node will forward them before other packets, because the DS field indicates that they are high priority. This example is somewhat of a simplification, for the DS field classification scheme is more complicated than merely high or low priority, and takes into account throughput, delay, jitter, packet loss, and other traffic characteristics. Taken together, these traffic characteristics make up Quality of Service (QoS).

Because DiffServ classifies these packets into different categories, it works only upon "flow aggregates," which refers to a collection of packet flows. In other words, an interior network node does not know what a packet contains or if that packet is part of a series of packets; the interior node merely treats it as a member of a certain classification of traffic characteristics. This is in contrast to another method of assuring QoS over a network, the Resource ReSerVation Protocol (RSVP). RSVP sets up a path from network node to network node for a particular packet flow. For example, if an end client device wishes to establish a telephone call over the network, the device would use RSVP to establish a path to the callee's end client device through one or more network nodes. The individual network nodes on the path would then know that a particular identified packet flow will require certain traffic conditions, and resources will be reserved for them. When a node receives one of the packets in the series of packets, the node will recognize it and behave accordingly. While DiffServ looks at flow aggregates, RSVP looks at individual "micro-flows."

For the rest of this description, a DiffServ environment will be assumed. This means that the QoS requirements will be handled by edge routers which will tag individual packets appropriately, while interior network nodes will act upon packets based merely on their DS field.

Even assuming the QoS problems are being handled by DiffServ, there are other services automatically handled in a circuit-based environment which are problematic in an IP-based network. A call has to be set up, establishing a connection between the two end devices, and the resources used in an individual call or session must be tracked, for accounting purposes. In addition, there needs to be the capability to have only authorized sessions or calls from authenticated users. In the Internet framework, these issues are resolved by different protocols that do different things. Although these individual protocols have been developed in detail, there is at present no KP May 22, 2002 known method that sets forth how to use them together in a consistent way across the Internet.

Thus, there is a need for linking these protocols together in a consistent and workable way. In particular, there is a need for a method providing an interchange of parameters among protocols between session setup, authorization, policy, and usage reporting that will support IP communications between Internet Service Providers (ISPs), enterprise networks, and individual clients.

SUMMARY OF THE INVENTION

The present invention provides a method for providing an interchange of parameters among protocols for session setup, teardown, authorization, policy, and usage reporting that will support IP communications in a Differentiated Services model environment.

The present invention provides a method for session or call setup, teardown, authorization, policy and usage reporting in a common way of usage, thereby supporting IP communications across the Internet.

The present invention also provides a method to link together the Session Initiation Protocol (SIP), Common Open Policy Service (COPS), and Open Settlement Policy (OSP) in a Differentiated Services model environment.

These and other objects are achieved by the preferred embodiment of the present invention. In the preferred embodiment, the messages from the Session Initiation Protocol (SIP), Common Open Policy Service (COPS), and Open Settlement Policy (OSP) are interwoven so that session setup, authorization, policy, and usage reporting are all performed concurrently, in one unified sequence of messages. Likewise, the messages from the Session Initiation Protocol (SIP), Common Open Policy Service (COPS), and Open Settlement Policy (OSP) are interwoven so that session teardown, authorization, policy, and usage reporting are all performed concurrently, in one unified sequence of messages.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENTS

As stated above, in the prior art there has been no linkage between the individual protocols that provide for call setup, authorization, accounting, and authentication. These steps are taken care of by the following protocols:

Session Initiation Protocol (SIP)—for setting up connections, or calls;

Common Open Policy Service (COPS)—for policy deployment in network elements; and Open Settlement Protocol (OSP)—for authorization and usage reporting.

These protocols will be discussed in detail below. In these discussions, the terms "client" and "server" will be used in their abstract functional sense, as processes that may be implemented in any sort of device. This means, of course, that some servers and clients may be running in the same device.

a) Session Initiation Protocol (SIP)

SIP is a signaling protocol that allows for initiating and tearing down connections. There are two components in a SIP system: network servers and user agents. A user agent is an end system that acts on behalf of someone who wants to participate in calls. In general, the user agent contains both a protocol client (a user agent client UAC) which initiates a call and a protocol server (user agent server UAS) which responds to a call (see FIG. 2). There are two different type of network servers as well: a proxy server, which receives requests, determines which server to send it to, and then forwards the request; and a redirect server, which receives requests, but instead of forwarding them to the next hop server, tells the client to contact the next hop directly.

Figure 1:
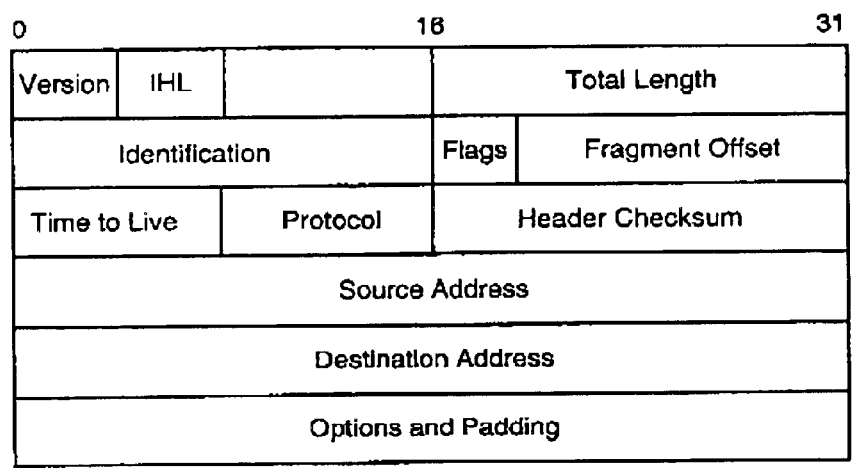
FIG. 1 shows an Internet Protocol Header.
Figure 2:
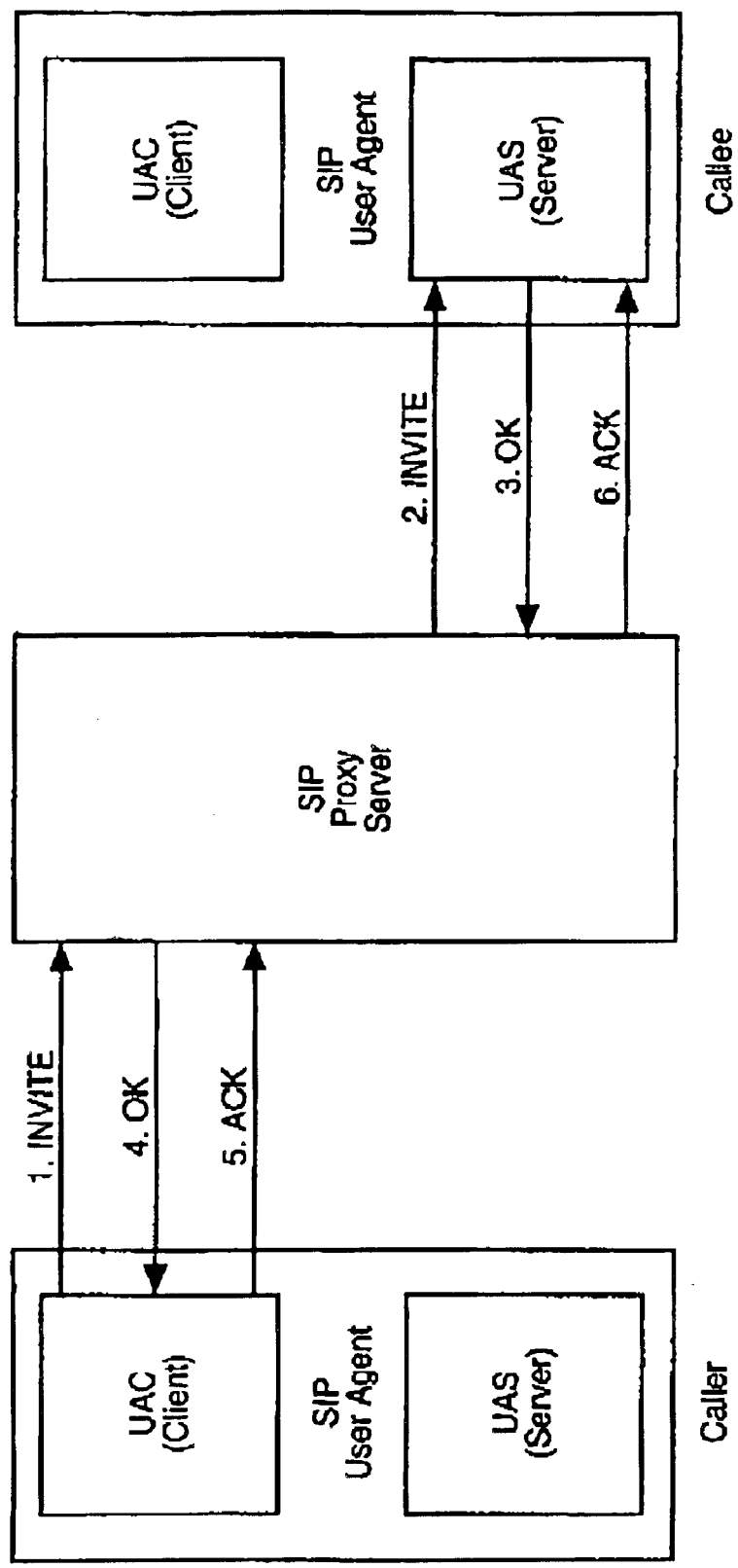
FIG. 2 shows the components of a SIP-based network and an overview of initiating a session.

The steps in initiating a session are fairly simple: as shown in FIG. 2, (1) the UAC sends an INVITE request to a SEP server, which in this case, is a proxy server. The proxy server will look in its database to determine where to send the INVITE request. Once that is determined, the proxy server sends the INVITE message to the appropriate next hop. In FIG. 2, the next hop is the callee, but, in reality, there could be a number of hops between the proxy server and the callee. If the proxy server is a redirect server, it would inform the UAC what the appropriate next hop is, and let the UAC do the rest. Once (2) the INVITE message finally reaches the callee UAS, (3) the callee UAS responds with an OK message, which (4) is forwarded to the caller UAC. When the caller UAC receives the OK message, indicating the callee has received the INVITE, (5) the UAC sends an ACK message, which, when (6) received, will start the session.

The steps in terminating a session, or teardown, are even more simple: the UAC sends a BYE message, and the UAS sends a message indicating receipt of the BYE message. In SIP, either the UAC or the UAS may send the BYE message terminating a session.

b) Common Open Policy Service (COPS)

Figure 3:
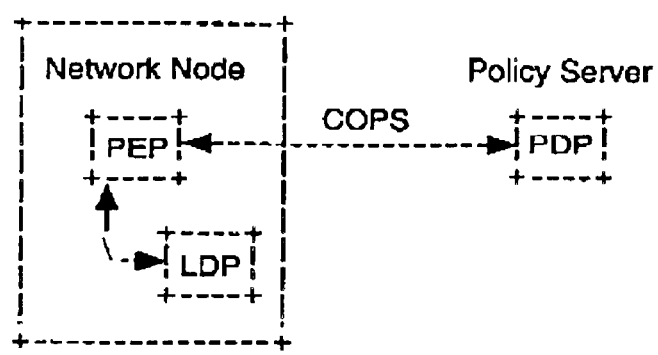
FIG. 3 shows the components of a Common Open Policy Service (COPS) system.

COPS is a simple query and response protocol that can be used to exchange information between a policy server (Policy Decision Point or PDP) and its clients (Policy Enforcement Points or PEPs), as shown in FIG. 3. A policy is a combination of rules and services that define the criteria for resource access and usage. In COPS the PEP sends requests, updates, and deletions to the PDP and the PDP returns decisions back to the PEP. The basic message formats for COPS include Requests (REQs), Decisions (DECs), and Report States (RPTs), among many others.

When particular events occur at a PEP, such as the initiation of a session, the PEP will send a REQ to the PDP to determine the policy regarding the session. The REQ may be an Authentication, Authorization, Accounting (AAA) REQ, which is asking that the session be authorized, authenticated, and kept track of for accounting purposes. If the PDP determines the session fits the AAA policy, the PDP will send its decision DEC to the PEP, thus allowing the PEP to allocate the needed resources. The RPT message is used by the PEP to communicate to the PDP its success or failure in carrying out the PDP's decision, or to report an accounting related change in state.

c) Open Settlement Protocol (OSP)

Figure 4:
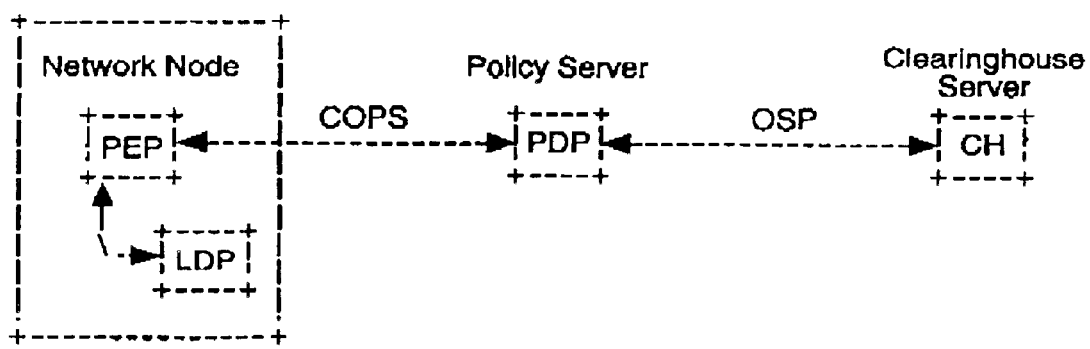
FIG. 4 shows the components of a Open Settlement Protocol (OSP) system.

OSP is used when there is a central clearinghouse for certain policy decisions. As shown in FIG. 4, OSP is the protocol describing communication between the policy server PDP and the clearinghouse server. This is needed in large networks which require multiple policy servers. Among other things, authorization for QoS levels is handled by the clearinghouse server. The clearinghouse server can also be a trust broker between a large number of network providers and the collecting place for usage reports. As an example, if a PEP sends a REQ AAA to a PDP, the PDP sends a message to the clearinghouse server in order to authorize the call or session. This message is in the form of a <AuthReq>, and the clearinghouse server responds with a <AuthRsp>, which may or may not contain an authorization token, which permits the REQ AAA to proceed. In addition, when a connection or session ends, the use of resources for that session or connection must be recorded for accounting purposes. When the policy server PDP de-installs a particular QoS policy, i.e. registers the end of a session, the policy server PDP sends a <UsageInd>message to the clearinghouse server so that the resource usage is recorded as well as monitored. The clearinghouse confirms the <UsageInd> with a <UsageCnf>.

As stated above, these protocols have been extensively defined and implemented, but to date there has been no common way of usage for combining them. A preferred embodiment of the present invention, as described below, combines these protocols in order to provide a consistent and common manner of usage for IP-based networks using the Differentiated Services model. In the description below of FIG. 5, a session setup according to the preferred embodiment of the invention will be explained in detail. In the description below of FIG. 6, a session teardown will be explained in detail.

Figure 5:
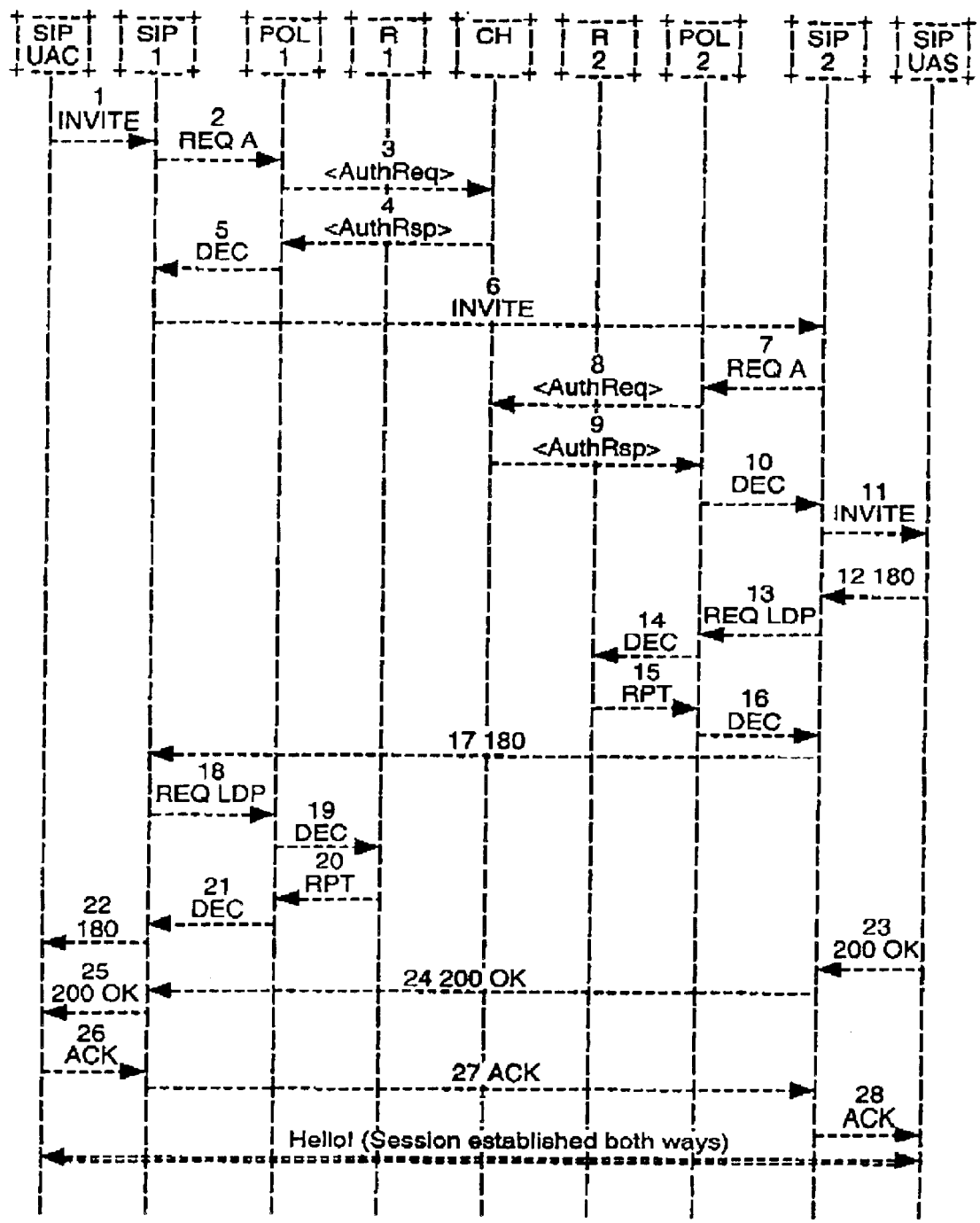
FIG. 5 shows a session initiation setup according to an embodiment of the present invention.

Referring to FIG. 5, at the origination end, there is a SIP user agent client UAC which is attempting to start a session, and the UAC has a local SIP proxy server SIP1, a local Policy server POL1, and a local Router R1. At the destination end, there is a SIP user agent server UAS, which the UAC is attempting to call, and the UAS has local SIP proxy server SIP2, a local Policy server POL2, and a local Router R2. Both the UAS and UAC share the same Clearinghouse CH, shown in the middle. Both POL1 and POL2 are acting as PDPs, and SIP1 and SIP2 are their corresponding PEPs. In the preferred embodiment, when the Clearinghouse sends a positive response to a resource usage request, the Clearinghouse also sends an authorization token. The unit receiving the call is the SIP user agent server UAS, which may be running in any type of IP telephone, computer, media device, or gateway. As stated above, both routers R1 and R2 are working based on the DiffServ model. Therefore, the routers will enforce QoS by altering the DS field in incoming session packets.

In general, the call setup request, authorization and policy installation occur as follows:

1) The UAC sends an INVITE message requesting call setup to SIP1;
2) SIP1 sends a REQ AAA message requesting authentication, authorization, and accounting for the UAC SIP session to the local policy server POL1;
3) Local policy server POLL sends a <AuthReq> message to the clearinghouse server CH;
4) The Clearinghouse server CH responds with a <AuthRsp> authorizing the session and sending an authorization token to POL 1;
5) POL1 sends a DEC message to SIP1, authorizing installation of the session;
6) SIP1 now forwards the INVITE message to SIP2;
7) SIP2 sends a REQ AAA message requesting authentication, authorization, and accounting for the SIP session to the local policy server POL2;
8) Local policy server POL2 sends a <AuthReq> message to the clearinghouse server CH;
9) The clearinghouse server CH responds with a <AuthRsp> authorizing the session and sending an authorization token to POL2;
10) POL2 sends a DEC message to SIP2, authorizing installation of the session;
11) SIP2 now forwards the INVITE message to user agent server UAS;
12) UAS responds with a 180 RINGING message, which means the UAS is alerting the user to the session;
13) SIP2 sends a REQ LDP message to POL2. This message requests that the appropriate policy be loaded onto R2 concerning this session; it is a local decision point (LDP) message, because the local policy server POL2 will make this decision, not the clearinghouse;
14) POL2 sends a DEC message to R2, telling R2 of the appropriate policy for the session packets. Since this is a DiffServ environment, router R2 will enable QoS by filling in the DS field of the session packets appropriately when they arrive at the router R2;
15) R2 responds with a RPT message indicating that the policy was installed;
16) POL2 informs SIP2 with a DEC message to install the same policy;
17) SIP2 now forwards the 180 RINGING message to SIP1;
18) SIP1 sends a REQ LDP message to POL1. This message requests that the appropriate policy be loaded onto R1 concerning this session; it is a local decision point (LDP) message, because the local policy server POL1 will make this decision, not the clearinghouse;
19) POL1 sends a DEC message to R1, telling R1 of the appropriate policy for the session packets. Since this is a DiffServ environment, router R1 will enable QoS by filling in the DS field of the session packets appropriately when they arrive at the router R1;
20) R1 responds with a RPT message indicating that the policy was installed;
21) POL1 informs SIP1 with a DEC message to install the same policy;
22) SIP1 now forwards the 180 RINGING message to UAC;
23) UAS responds with a 200 OK message;
24) SIP2 forwards this message to SIP1;
25) SIP1 forwards this message to UAC;
26) UAC acknowledges with an ACK message;
27) SIP1 forwards the ACK message to the SIP2;
28) SIP2 forwards the ACK message to UAS;
29) The session or connection commences.

The actual sequence of messages is divided between the three protocols: message steps 1, 6, 11, 12, 17, and 22–9 are SIP messages; message steps 2, 5, 7, 10, 13–16, 18–21 are COPS messages; and message steps 3–4 and 8–9 are OSP messages. In this manner, the preferred embodiment of the present invention links the three protocols for call setup, authorization, and accounting. Although the above sequence has been described with a clearinghouse server, the preferred embodiment can work in a system without a clearinghouse. In such a network, the policy server handles most of the clearinghouse tasks, and message steps 3–4 and 8–9 would take place inside the policy server.

Figure 6:
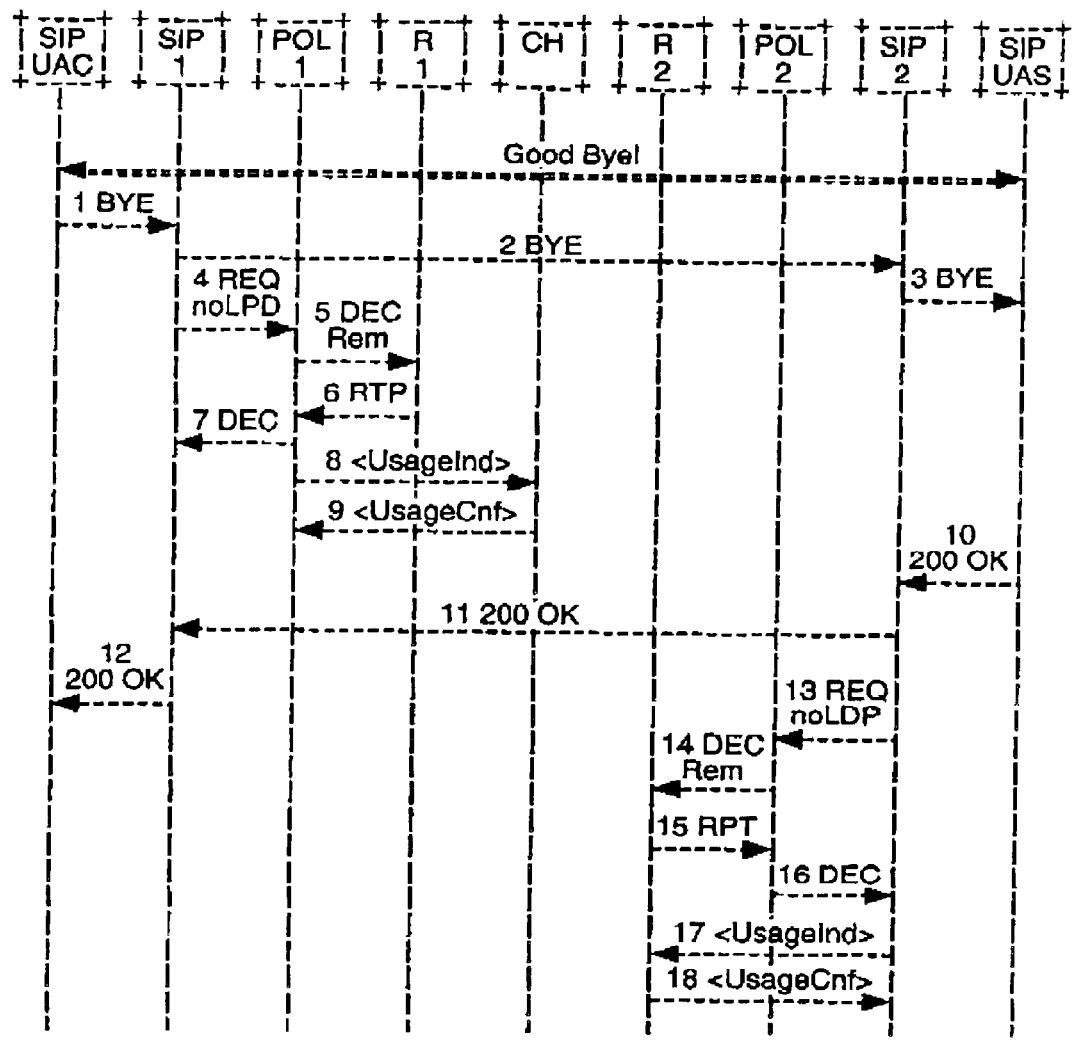
FIG. 6 shows a session teardown according to an embodiment of the present invention.

FIG. 6 shows the steps of a session teardown according to an embodiment of the present invention. The preferred embodiment also links together the protocols when ending a session, as shown in the following sequence of steps:

1) UAC signals the end of the session with a BYE message;

2) SIP1 forwards the BYE message to SIP2;
3) SIP2 forwards the BYE message to UAS;
4) SIP1 sends a REQ noLDP message canceling the policy given in the original REQ LDP message in message step 18 of the setup message sequence above;
5) POL1 sends a DEC Remove message to R1, telling the router to de-install the policy. Since this is a DiffServ environment, the router, up to this point, has been altering the DS field in each of the session packets that arrived. Now, the router will de-install that policy, and stop looking for this session's packets;
6) R1 confirms the policy de-installation with a RPT message to POL1;
7) POL1 sends a DEC message to SIP1, telling the server to de-install the policy;
8) POL1 sends a <UsageInd> message detailing the resource usage to clearinghouse CH;
9) CH confirms with a <UsageCnf> message;
10) UAS sends a 200 OK message confirming receipt of the BYE message;
11) SIP2 forwards the OK message to SIP1;
12) SIP1 forwards the OK message to UAC;
13) SIP2 sends a REQ noLDP message canceling the policy given in the original REQ LDP message in step 13 of the setup message sequence above;
14) POL2 sends a DEC Rem message to R2, telling the router to de-install the policy. Since this is a DiffServ environment, the router, up to this point, has been altering the DS field in each of the session packets that arrived. Now, the router will de-install that policy, and stop looking for this session's packets;
15) R2 confirms the policy de-installation with a RPT message to POL2;
16) POL2 sends a DEC message to SIP2, telling the server to de-install the policy;
17) POL2 sends a <UsageInd> message detailing the resource usage to CH; and
18) CH confirms with a <UsageCnf> message;

As with the setup message sequence described above, the actual sequence of messages is divided between the three protocols: message steps 1, 6, 11, 12, 17, and 22–9 are SIP messages; message steps 2, 5, 7, 10, 13–16, 18–21 are COPS messages; and message steps 3–4 and 8–9 are OSP messages. In this manner, the preferred embodiment of the present invention links the three protocols for call tear-down and usage reporting. Although this has been described with a clearinghouse server, the preferred embodiment can work in a system without a clearinghouse. In such a network, the policy server handles most of the clearinghouse tasks, and message steps 3–4 and 8–9 would take place inside the policy server.

While an embodiment of the present invention has been shown and described, it is to be understood that many changes and modifications may be made thereunto without departing from the spirit and scope of the invention as defined in the appended claims.

What is claimed is:

1. A method for providing Internet Protocol (IP) communications over at least one network with Quality of Service (QoS), comprising the steps of:
   initiating a communication session between at least one first end client device and at least one second end client device; and
   in response to initiating the communication session, performing the steps of:
   providing information to at least one server of the communication session according to a plurality of communication protocols including a first protocol for communication session establishment, a second protocol for deploying policy, and a third protocol for authorization of the communication session according to a QoS level, said information including policy information conveyed by the second protocol, and at least one of resource usage, authorization, authentication, and accounting information conveyed by the third protocol;
   providing the information by the one server to at least one router of the communication session for enabling a Quality of Service policy in session packets arriving at the router according to the second protocol; and
   establishing a communication session between said at least one first end client device and said at least one second end client device according to the first protocol.

2. The method as recited in claim 1, wherein the Quality of Service policy is in accordance with a Differentiated Services model, the one router altering a Differentiated Services field specifying Differentiated Services code points of the session packets.

3. The method as recited in claim 1, wherein the step of initiating a communication session is performed according to the first protocol, and further comprises the steps of:
   a) sending an initiation message from said at least one first end client device to said at least one second end client device;
   b) sending a message indicating receipt of said initiation message by the at least one second end client device;
   c) sending a message indicating the at least one second end client device is responding to the initiation message; and
   d) sending a message indicating a receipt of the message in (c) by the at least one first end client device and signaling the start of the communication session.

4. The method as recited in claim 3, wherein the first protocol includes Session Initiation Protocol (SIP).

5. The method as recited in claim 3, wherein said network includes at least one server for receiving and forwarding initiation messages.

6. The method as recited in claim 4, wherein said at least one server is a policy server, the method further comprising the steps of:
   a) sending a message requesting said at least one of resource usage, policy, authorization, authentication, and accounting information to at least one policy server; and
   b) sending a message responding to the message in (a) with at least one of resource usage, policy, authorization, authentication, and accounting information;
   wherein said at least one of resource usage, policy, authorization, authentication, and accounting information is according to the at least one QoS policy.

7. The method as recited in claim 6, wherein steps (a) and (b) are performed on a plurality of policy servers, one of the plurality of policy server being a local policy server for the first end client device, and one of the plurality of policy servers being a local policy server for the second end client device.

8. The method as recited in claim 6, wherein the second protocol includes Common Open Policy Service (COPS).

9. The method as recited in claim 1, wherein the step of providing information to at least one router of the communication session is according to the second protocol, and further comprises the steps of:

a) sending a message requesting a local policy decision, b) sending a message installing policy to at least one router, and c) sending a message confirming installation.

10. The method as recited in claim 9, wherein the at least one router performs according to a Differentiated Services model.

11. The method as recited in claim 9, wherein steps (a)–(c) are performed on a plurality of routers, one of the plurality of routers being a local router for the first end client device, and one of the plurality of routers being a local router for the second end client device.

12. The method as recited in claim 9, wherein the second protocol includes Common Open Policy Service (COPS).

13. The method as recited in claim 8, wherein said network includes at least one clearinghouse server, said clearinghouse server providing resource usage, policy, authentication, authorization, and accounting information to each of said plurality of policy servers, said method further comprising the steps of:

a) sending a message requesting at least one of resource usage, policy, authentication, authorization, and accounting information to the at least one clearinghouse server according to the third protocol, and b) sending a message including at least one of resource usage, policy, authentication, authorization, and accounting information to the at least one policy server, according to the third protocol.

14. The method as recited in claim 13, wherein the third protocol includes Open Settlement Policy (OSP).

15. The method as recited in claim 1, wherein the network uses an authorization token to indicate that a session is authorized.

16. A method of providing Internet Protocol (EP) communications over at least one network with Quality of Service (QoS), comprising the steps of:

initiating termination of a communication session between at least one first end client device and at least one second end client device according to a first protocol; and in response to initiating the termination, performing the steps of:

providing information to at least one server of the communication session according to a plurality of communication protocols including the first protocol for communication session establishment, a second protocol for deploying policy, and a third protocol for authorization of the communication session according to a QoS level, said information including policy information conveyed by the second protocol, and at least one of resource usage, authorization, authentication, and accounting information conveyed by the third protocol; and providing the information by the one server to at least one router of the communication session for de-installing a Quality of Service policy at the router according to the second protocol.

17. The method as recited in claim 16, wherein the Quality of Service policy is in accordance with a Differentiated Services model.

18. The method as recited in claim 16, further comprising the steps of:

a) sending a termination message from the said at least first end client device to said at least one second end client device; and b) sending a message indicating receipt of said termination message by the at least one second end client device.

19. The method as recited in claim 18, wherein the first protocol includes a Session Initiation Protocol (SIP).

20. The method as recited in claim 16, wherein said network includes at least one additional server for receiving and forwarding termination messages.

21. The method as recited in claim 18, wherein said at least one server is a policy server, the method further comprising the steps of:

a) sending a message requesting the de-installation of policy corresponding to terminating the session to at least one policy server, and b) sending a message responding to the message in (a) confirming the de-installation of said policy.

22. The method as recited in claim 21, wherein steps (a) and (b) are performed a plurality of policy servers, one of the plurality of policy servers being a local policy server for the first end client device, and one of the plurality of policy servers being a local policy server for the second end client device.

23. The method as recited in claim 21, wherein the second protocol includes Common Open Policy Service (COPS).

24. The method as recited in claim 16, further comprising the steps of:

a) receiving a message requesting de-installation of a local policy decision corresponding to the terminating session, b) sending a message directing a de-installation of said policy to at least one router, and c) receiving a message confirming de-installation.

25. The method as recited in claim 24, wherein the at least one router performs according to a Differentiated Services model.

26. The method as recited in claim 24, wherein steps (a)–(c) are performed on a plurality of routers, one of plurality of routers being a local router for the first end client device, and one of the plurality of routers being a local router for the second end client device.

27. The method as recited in claim 24, wherein the second protocol includes Common Open Policy Service (COPS).

28. The method as recited in claim 24, wherein a policy server performs step (a), said method further comprising:

storing information concerning at least one of resource usage, policy, authorization, authentication, and accounting information concerning the terminating session.

29. The method as recited in claim 27, wherein said network includes at least one clearinghouse server, said clearinghouse server storing resource usage, policy, authentication, authorization and accounting information for each of said plurality of policy servers according to the third protocol, said method further comprising the steps of:

a) sending a message reporting at least one of resource usage, policy, authentication, authorization, and accounting information concerning terminating the session to the at least one clearinghouse server; and b) sending a message confirming the receipt of the message in step (a) to the at least one policy server.

30. The method as recited in claim 29, wherein the third protocol includes Open Settlement Policy (OSP).

31. The method as recited in claim 16, wherein the network uses an authorization token to indicate that a session is authorized.

32. A method of supporting differentiated voice services over a data network, the method comprising:

receiving a call setup request for establishment of a call over the data network according to a Session Initiation Protocol (SIP);

generating a first request for authentication, authorization, and accounting for the call according to a Common Open Policy Service (COPS) protocol to a policy server that generates, according to an Open Settlement Protocol (OSP), a second request specifying a policy for the call based on the first request, and forwards the second request to a clearinghouse server for authorization of the call according to the Open Settlement Protocol (OSP);

receiving a decision message from the policy server authorizing the call according to the COPS protocol upon the clearinghouse server responding to the second request; and transmitting the call setup request to a SIP agent for establishment of the call in response to the decision message.

33. A method according to claim 32, further comprising:

instructing the policy server to install the policy in a router supporting the call.

* * * * *

UNITED STATES PATENT AND TRADEMARK OFFICE
CERTIFICATE OF CORRECTION

PATENT NO. : 6,970,930 B1 Page 1 of 1
APPLICATION NO. : 09/435540
DATED : November 29, 2005
INVENTOR(S) : Steven R. Donovan It is certified that error appears in the above-identified patent and that said Letters Patent is hereby corrected as shown below:

On title page
In Item (56) References Cited,

Please add to the U.S. PATENT DOCUMENTS section the following:
        6,324,279 B1   11/2001    Kalmanek, Jr. et al.
        6,755,701 B1    8/2004    Pan et al.
        6,801,940 B1   10/2004    Moran et al.
        6,826,613 B1   11/2004    Wang et al.
        6,857,012 B2    2/2005    Sim et al.
2002/0016839 A1    2/2002    Smith et al.
2002/0026513 A1    2/2002    Hoglund et al.

Item [56]
Please add to the OTHER PUBLICATIONS section the following:
Aiken et al., "Network Policy and Services: A Report of a Workshop on Middleware", Internet Engineering Task Force, Request for Comment 2768, February 2000.
Aspnes et al., "On-Line Routing of Virtual Circuits with Applications to Load Balanacing and Machine Scheduling", Journal of the ACM, Vol. 44, No. 3, May 1997, pp. 486-504.
Bhuyan et al., "Impact of Switch Design on the Application Performance of Cache-Coherent Multiprocessors", 1998, http://www.cs.tamu.edu/people/ravi/IPP398.ps.g2.

Signed and Sealed this

Twenty-sixth Day of February, 2008

JON W. DUDAS
*Director of the United States Patent and Trademark Office*